United States Patent [19]
Sturek

[11] 3,782,774
[45] Jan. 1, 1974

[54] CAMPER TIE-DOWN SYSTEM
[76] Inventor: James S. Sturek, 741 E. Grand River, Fowlerville, Mich. 48836
[22] Filed: Dec. 14, 1972
[21] Appl. No.: 315,255

[52] U.S. Cl............................ 296/23 MC, 296/35 A
[51] Int. Cl............................................... B60p 7/16
[58] Field of Search..................... 296/23 R, 23 MC, 296/35 A

[56] References Cited
UNITED STATES PATENTS
3,638,895  2/1972  Henson........................... 296/23 MC
3,402,961  9/1968  Larson............................ 296/23 MC Primary Examiner—Philip Goodman
Attorney—Keith L. Zerschling et al.

[57] ABSTRACT

A camper tie-down system utilizing a two strut support system with pinned joints designed to withstand the loads created by pick-up campers. The system does not rely on the outer panel or stake pocket of the pick-up body for attachment or support, but rather attaches to the chassis frame and pick-up box underbody forming a rigid attachment at the vehicle. The system offers compliance and pre-load adjustment by way of a rod assembly.

5 Claims, 1 Drawing Figure

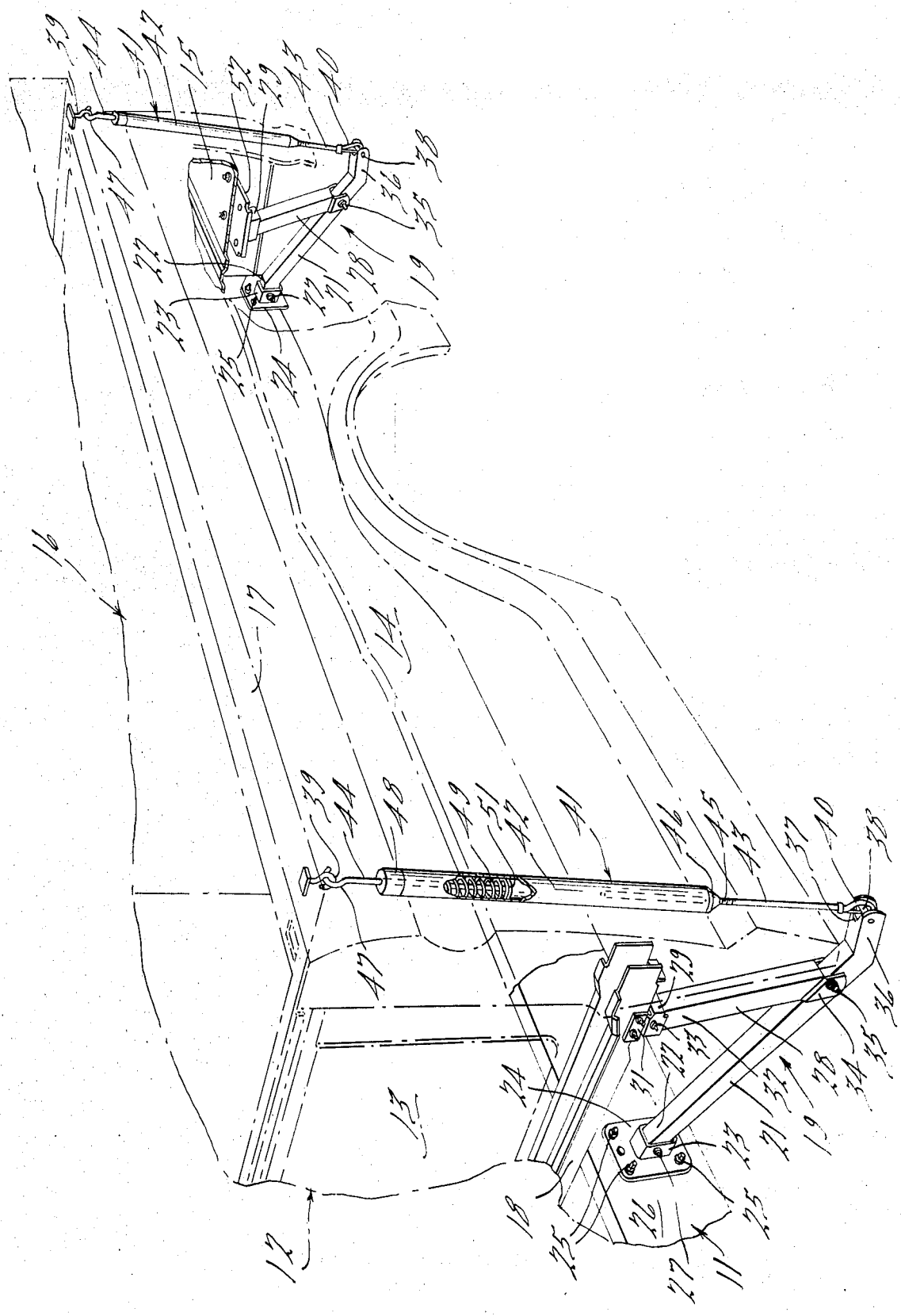

3,782,774

CAMPER TIE-DOWN SYSTEM

BACKGROUND OF THE INVENTION

Of the many ways that have been suggested for removably securing a camper body to the bed of a pick-up truck, those which utilize a tie-down system coupled to the frame of the vehicle are considered to be superior. As pointed out in U.S. Pat. No. 3,368,785 issued on Feb. 13, 1968 to R. C. Weiler for a "Camper Hold Down Bracket," a releasable connection between the camper and the exterior of the truck body results in defacement of the truck body and is not an absolute securing means for a heavy camper in transit.

It is an object of the present invention to provide an improved tie-down system which securely attaches to the chassis frame and pick-up box underbody and offers compliance and pre-load adjustment features.

SUMMARY OF THE INVENTION

The present invention relates to a camper tie-down system for securing a camper unit to a pick-up truck frame and body structure. The camper tie-down comprises a two strut support system in which a first strut extends laterally outwardly from the truck frame and a second strut extends downwardly from the camper unit underbody to the first strut. A first bracket means is secured to the frame to which the inboard end of the first strut is pinned for limited pivotal movement. A second bracket means is secured to the camper unit underbody to which the upper end of the second strut is pinned for limited pivotal movement. The lower end of the second strut is pivotally pinned to the first strut intermediate the ends of the latter. A spring-loaded rod assembly provides compliance and pre-load adjustment between the camper unit and truck body, the rod assembly extending from an anchor on the outer end of the first strut to an anchor on a flange on the camper unit extending outwardly from a side panel of the body structure.

DESCRIPTION OF THE DRAWING

FUrther features and advantages of the present invention will be made more apparent as this description proceeds, reference being had to the accompanying drawing which is a fragmentary perspective view of a part of a vehicle or truck frame and pick-up box having a camper unit mounted thereon and secured by the two strut system embodying the present invention.

DETAILED DESCRIPTION OF THE INVENTION

Referring now to the drawing, there is illustrated a fragmentary portion of the chassis frame 11 of a pick-up truck having a pick-up box 12. The pick-up box 12 is open at the top and has a front panel 13, a double wall side panel 14 and a floor 15. The pick-up box 12 is adapted to receive a camper unit 16, a fragmentary dot and dash outline of which is shown. A conventional camper unit 16 is designed so that its lower portion fits within the pick-up box 12 and its upper portion extends outwardly so as to provide a flanged overhang 17 above each side panel 14 of the box 12. At its front end, the pick-up box 12 is supported on the frame 11 by a cross member 18.

It is necessary that the camper unit 16 be secured or tied down in place within and on the pick-up box 12. The tie-down system embodying the present invention utilizes a two strut support system, generally designated 19.

The two strut tie-down system 19 comprises a first strut 21 that extends laterally outwardly of the truck frame 11. The strut 21 is of a generally square and hollow cross-section. The inner end 22 of the strut 21 is seated in a socket 23 that is part of a bracket 24 adapted to be secured by bolts 25 to the side face 26 of the frame 11. The strut 21 is held in the socket 23 by a pin 27. The socket 23 is complementary in shape but slightly oversized compared to the strut end 22 and the pin 27 permits limited pivotal or up and down swinging movement of the strut 21 about the axis of the pin 27.

The second strut of the two strut tie-down system is a substantially downwardly extending strut 28 which extends from the under side of the camper unit underbody to the first strut 21. At the front end of the pick-up box, the strut hangs from the socket 29 of a clamp bracket 31, the latter being bolted to the cross member 18. The strut 28 is held at its upper end 32 within the socket 29 by a pin 33. The relationship of the strut end 32 to the socket 29 is such that the strut is permitted limited pivotal or swinging movement about the pin 33.

At its lower end 34, the strut 28 is provided with a clevis portion that straddles the strut 21 intermediate the ends of the latter. The strut 28 and strut 21 are pivotally coupled by a horizontally extending pivot pin 35.

The strut 21 is of a length sufficient to permit it to extend outwardly beyond the side panel 14 of the truck body. The strut terminates in an upwardly inclined end portion 36 having a notch 37 permitting access to a horizontal pin 38. Depending from the under side of the overhanging flange 17 of the camper unit 16 is a hook 39.

The pin 38 and hook 39 provide anchors for the opposite ends of a rod assembly, generally designated 41. The rod assembly 41 comprises a tubular housing 42 having rods 43 and 44, respectively, projecting axially from each end. The lower rod 43 is threadedly engaged at 45 with an end cap 46 on the tubular housing 42. The rod 43 terminates at its lower end in a snap-hook 40 adapted to clip over the pin 38.

The rod 44 terminates at its upper end in a hook 47 adapted to engage the hook 39 on the camper unit flange 17. The rod 44 body portion slidably passes through an end cap 48 on the tubular housing 42. The rod 44 is spring-loaded by a coil compression spring 49 which is trapped between the end cap 48 and a spring retainer 51 on the lower end of the rod 44.

The compression or pre-load on the spring is adjustable by changing the effective length of the rod assembly 41 after the latter is positioned between the anchor points 38 and 39. This is done by rotating the tubular housing 42 to cause the rod 43 to be threaded into the housing to shorten the effective length of the rod assembly 41 or to cause the rod to be threaded out of the housing to lengthen the effective length of the rod assembly 41. If the effective length of the rod assembly 41 is shortened, the spring will be placed under greater compression and, conversely, if the effective length of the rod 41 is lengthened, the spring will be placed under decreased compression.

The foregoing description has discussed in detail the construction and arrangement of the two strut support system shown at the front end of the camper unit. It will be understood that the two strut system used at the rear end is substantially the same. The only noticeable difference is the use of a bracket 53 very similar to the bracket 24 used on the side face of the chassis frame 11. The bracket 53 is bolted to the underside of the floor 15 of the pick-up box.

The foregoing construction and arrangement provides a secure attachment of a camper unit to a chassis frame and pick-up box underbody of a pick-up truck. The rod assembly 41 offers a system having compliance and pre-load adjustment.

It is to be understood that the invention is not limited to the exact construction illustrated and described above, but that various changes and modifications may be made without departing from the spirit and scope of the invention defined by the following claims:

I claim:

1. A camper tie-down system for securing a camper unit to a pick-up truck frame and body structure, comprising:
    a two strut support system in which a first strut extends laterally outwardly from the truck frame and a second strut extends downwardly from the camper unit underbody to the first strut,
    a first bracket means secured to the frame to which the inboard end of the first strut is pinned for limited pivotal movement,
    a second bracket means secured to the camper unit underbody to which the upper end of the second strut is pinned for limited pivotal movement,
    the lower end of the second strut being pivotally pinned to the first strut intermediate the ends of the latter,
    and a spring-loaded rod assembly providing compliance and pre-load adjustment between the camper unit and truck body,
    the rod assembly extending from an anchor on the outer end of the first strut to an anchor on a flange on the camper unit extending outwardly of a side panel of the body structure.

2. A camper tie-down system according to claim 1, in which:
    the rod assembly comprises a tubular member housing a spring and having threaded engagement with one rod extending longitudinally thereof for connection to an anchor,
    the tubular housing being rotatable relative to the threaded rod to threadedly move one relative to the other and thereby vary the effective lift of the rod assembly and the preload on the spring.

3. A camper tie-down system according to claim 2, in which:
    the first bracket means has a socket into which the inboard end of the first strut projects for its limited pivotal movement.

4. A camper tie-down system according to claim 3, in which:
    the second bracket means has a socket into which the upper end of the second strut projects for its limited pivotal movement.

5. A camper tie-down system according to claim 1, in which:
    the first bracket means has a socket into which the inboard end of the first strut projects for its limited pivotal movement,
    and the second bracket means has a socket into which the upper end of the second strut projects for its limited pivotal movement.

* * * * *

UNITED STATES PATENT OFFICE
CERTIFICATE OF CORRECTION

Patent No. 3,782,774        Dated January 1, 1974

Inventor(s) James S. Sturek

It is certified that error appears in the above-identified patent and that said Letters Patent are hereby corrected as shown below:

Add to the title block

[73] Assignee: FORD MOTOR COMPANY,
              Dearborn, Mich.

Signed and sealed this 14th day of May 1974.

(SEAL)
Attest:

EDWARD M. FLETCHER, JR.         C. MARSHALL DANN
Attesting Officer               Commissioner of Patents